(12) United States Patent
Yelles

(10) Patent No.: US 8,701,427 B2
(45) Date of Patent: Apr. 22, 2014

(54) FOG DETECTION ERROR PROTECTION FOR WINDOW FOG CONTROL

(75) Inventor: Daniel Yelles, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 2061 days.

(21) Appl. No.: 11/624,243

(22) Filed: Jan. 18, 2007

(65) Prior Publication Data

US 2008/0173437 A1    Jul. 24, 2008

(51) Int. Cl.
B60H 1/32 (2006.01)
F25D 21/00 (2006.01)
F25D 17/04 (2006.01)
F24F 3/14 (2006.01)
G05D 23/00 (2006.01)

(52) U.S. Cl.
USPC ............. 62/133; 62/150; 62/176.6; 236/44 C; 165/230; 165/291; 700/276

(58) Field of Classification Search
USPC ........ 62/133, 150, 176.6; 236/44 C; 165/204, 165/230, 291; 700/276, 299
See application file for complete search history.

(56) References Cited

U.S. PATENT DOCUMENTS

| | | | |
|---|---|---|---|
| 5,992,162 A | 11/1999 | Heinle et al. | |
| 6,155,061 A * | 12/2000 | Davis et al. | 62/176.6 |
| 6,422,062 B1 * | 7/2002 | King et al. | 73/29.01 |
| 6,625,995 B2 * | 9/2003 | Remond et al. | 62/133 |
| 2005/0121185 A1 * | 6/2005 | Yonekura et al. | 165/202 |
| 2006/0000597 A1 | 1/2006 | Errington et al. | |
| 2006/0004494 A1 * | 1/2006 | Errington | 701/1 |

FOREIGN PATENT DOCUMENTS

| | | |
|---|---|---|
| JP | 7-179120 | 7/1995 |
| JP | 2002-137630 | 5/2002 |

* cited by examiner

*Primary Examiner* — Allana Lewin
*Assistant Examiner* — Travis Ruby
(74) *Attorney, Agent, or Firm* — Mark E. Duell; Rankin, Hill & Clark LLP

(57) ABSTRACT

A method for controlling a vehicle HVAC system to automatically defog a windshield glass and to prevent fogging or condensation of the windshield glass. In-cabin air temperature and relative humidity are measured and used to determine a dewpoint. Further, ambient or outside temperature is measured. If windshield wipers are being used or if the cabin air temperature is less than a predetermined temperature, the ambient air temperature value is used as a glass temperature, otherwise the glass temperature is determined from the ambient air temperature and vehicle speed. A fog margin, which is a measure of the likelihood of fog formation, is based upon the difference between dewpoint and the windshield glass temperature. The fog margin is used to control the HVAC system to anticipate and respond to potential fogging conditions.

6 Claims, 4 Drawing Sheets

FOG DETECTION ERROR PROTECTION FOR WINDOW FOG CONTROL

BACKGROUND OF THE INVENTION

1. Field of the Invention

The present invention is directed toward a method for controlling a vehicle heating, ventilation, and air conditioning (HVAC) system. In particular, the present invention relates to automatically sensing fogging conditions, and instituting appropriate measures to prevent fogging and to remove window fog should fog be present.

2. Description of Related Art

In modern vehicles it is common to have an HVAC system for a user compartment (hereinafter "cabin"). The HVAC system provides warm and cool air to the cabin of the vehicle. The HVAC system allows users to select a set temperature for the cabin. Once the set temperature is selected, the HVAC system will provide conditioned air to adjust the climate of the cabin to the set temperature. Further, the HVAC system is used to eliminate fog or condensation that appears on the vehicle windows and reduces or eliminates visibility into or out of the cabin.

In conventional automobile control systems, application of remedial measures to combat fogging of the vehicle windows is manually instituted by the vehicle passengers. Naturally, such remedial measures, which primarily consist of activating the HVAC system into a defrost mode of operation, are employed after a fogging condition has developed, and typically require some time to alleviate the fogging condition. As will be appreciated, such systems are not suitable for automatic control, and do not anticipate impending fogging conditions.

In vehicles incorporating an automatic HVAC control system, it has been proposed to sense internal and external conditions to determine whether fogging is likely. Such known systems include a glass temperature sensor and a humidity sensor. The glass temperature sensor is affixed to an internal surface of the windshield glass, and the humidity sensor is disposed adjacent to the windshield glass. The system uses the sensed glass temperature and the sensed cabin humidity to determine whether a possible fogging condition exists, and actuates the HVAC system in response thereto. Unfortunately, such automated systems require additional sensors, which are expensive to purchase and require significant amounts of labor to install and electrically connect to a controller.

An alternative automatic HVAC control system senses cabin temperature, cabin humidity, ambient temperature, and vehicle speed. Such a system calculates a cabin dewpoint based upon the cabin temperature and cabin relative humidity. Further, the system estimates a glass temperature based upon the ambient temperature and the vehicle speed. Then, a fog margin, which is the difference between the cabin dewpoint and the estimated glass temperature, is determined. The lower the value of the fog margin, the more likely that fogging of the windshield will occur. The fog margin is used to accordingly control the HVAC system.

Unfortunately, this alternative automatic control does not take into consideration the presence of precipitation, such as rain or snow, outside of the vehicle. Nor does the alternative automatic control take into consideration when the cabin temperature is less than a predetermined value, such as for example, when the user initially enters the cabin on a cold day. During this condition, which is known as cabin soaking, the cabin temperature is less than the predetermined value and the windshield is relatively more susceptible to fogging. Accordingly, precipitation or cabin soaking can influence the appearance of fog on the windows.

Therefore, there exists a need in the art for a method to better control the HVAC system so as to prevent fogging during precipitation or soaking conditions.

SUMMARY OF THE INVENTION

The present invention is directed toward a method to prevent fogging conditions from occurring in a vehicle.

In accordance with one aspect of the invention, a method for calculating a vehicle windshield glass temperature is provided. The method employs existing sensors and calculates or estimates the glass temperature based upon the vehicle speed and the ambient temperature. The sensed speed and ambient temperature are input into a computer-based lookup table and correlated to experimentally determined windshield temperatures. Further, under certain conditions, such as when the windshield wipers are being operated or when the cabin is soaking, instead of using the lookup table, ambient temperature is substituted as the windshield glass temperature.

Further according to the present invention, a method for determining a control parameter, which may be used by a vehicle HVAC system to predict the potential for vehicle fogging, is provided. The control parameter, fog margin, is calculated based on a dewpoint of air within the vehicle cabin and the windshield glass temperature. The windshield glass temperature is either determined by a calculation based upon vehicle speed and ambient temperature or, under certain conditions, by substituting the ambient temperature for the windshield glass temperature. The fog margin is indicative of the quality of the threat of condensation or fog formation on the windshield glass. The HVAC system is controlled based upon the fog margin to provide a response that is correlated to the condensation threat.

BRIEF DESCRIPTION OF THE DRAWINGS

These and further features of the invention will be apparent with reference to the following description and drawings, wherein.

DETAILED DESCRIPTION OF THE PREFERRED EMBODIMENTS

Figure 1:
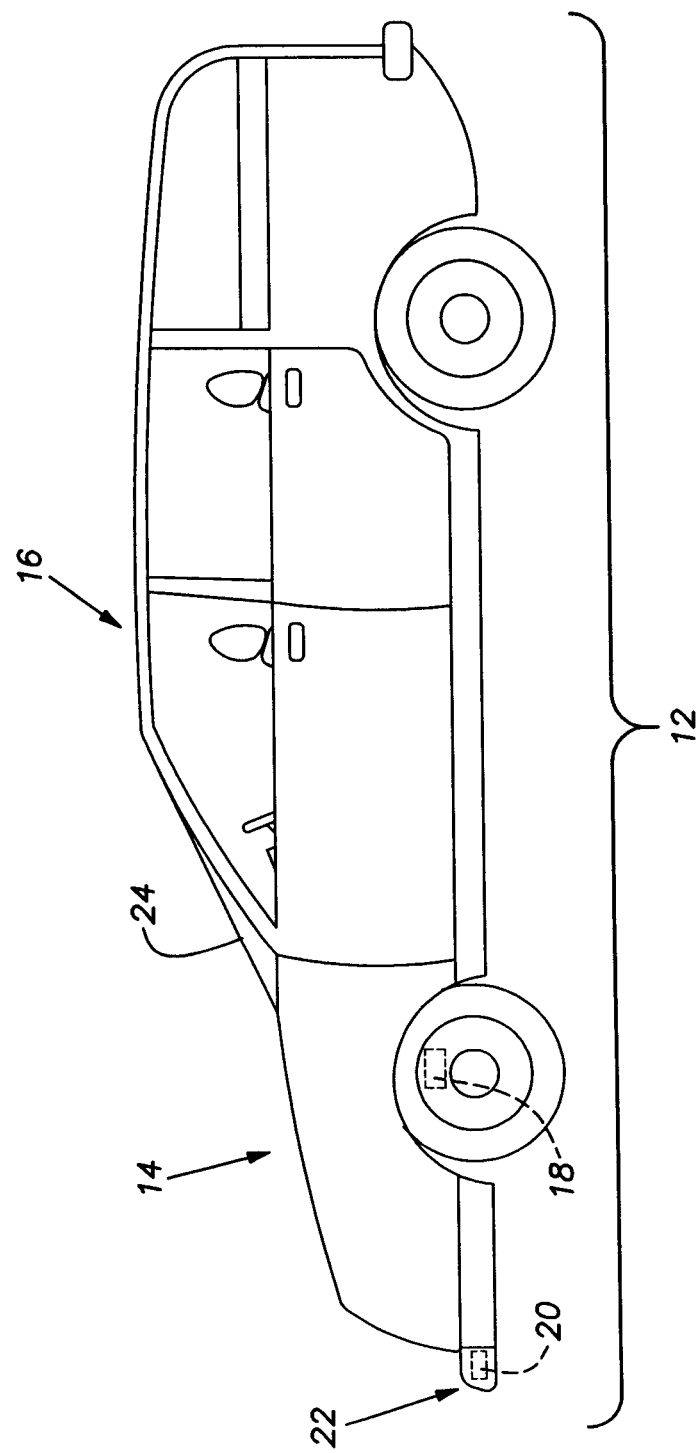
FIG. 1 is a side view of a vehicle with an automatic defogging control system of the present invention.
Figure 2:
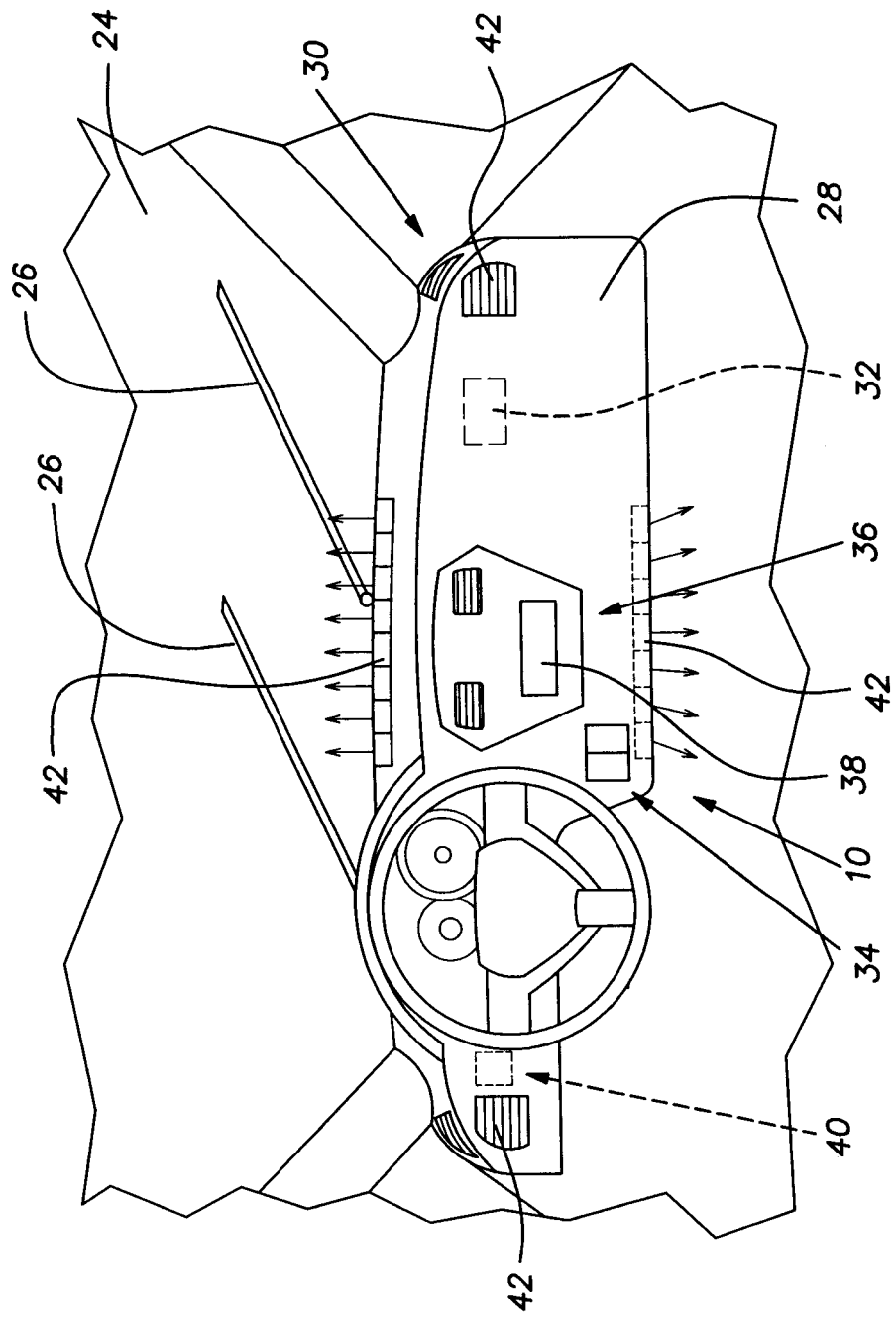
FIG. 2 is an perspective view of an interior of the vehicle of FIG. 1.
Figure 3:
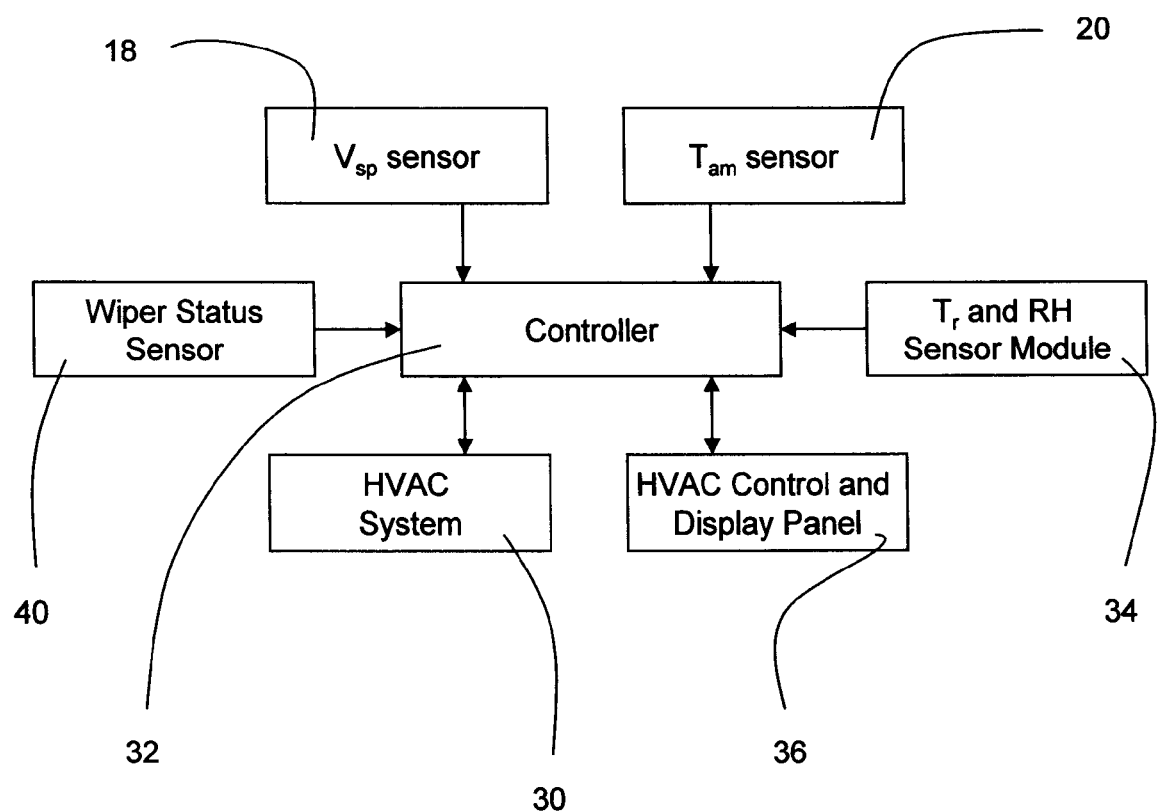
FIG. 3 is schematically illustrates components of the automatic defogging control system.

With reference to FIGS. 1-3, an automatic defogging system (ADS) 10 according to the present invention is shown disposed in a vehicle 12. The vehicle 12 includes an engine area 14 and a cabin 16. In or around the engine area 14 are a vehicle speed sensor 18, an ambient temperature sensor 20, and a front bumper 22. A windshield 24 is situated around the vehicle 12 so as to provide viewing opportunities into and out of the cabin 16. Windshield wipers 26 are disposed outside of the vehicle 12 and contact the windshield 24 to remove precipitation. Many elements of the ADS 10 and an HVAC system 30 are disposed on or around a dashboard 28. With respect to the ADS 10, a controller 32, an integrated cabin temperature and humidity sensor module 34, a control and display panel 36 with a touch screen 38, and a wiper status sensor 40 are disposed on or around the dashboard 28. Further, although not illustrated, it is considered known in the art that an A/C system and heater system are part of the HVAC system 30. The A/C system supplies cooled air to the cabin 16, while the heater system supplies heated air to the cabin 16. Ducts (not shown) and fans (not shown) supply the cooled and heated air to outlets 42 for distribution into the cabin 16.

As will be appreciated, the ADS 10 is incorporated into the vehicle's computer based HVAC system 30, which preferably includes several modes of operation. The ADS 10, as part of the HVAC system 30 and as described hereinafter, is intended to be operational when the HVAC system 30 is operated in an automatic mode of operation and to operate seamlessly as one step or sequence of steps during the automatic mode of operation.

In such an automatic mode, a user (not shown) selects a set temperature and the controller 32 makes necessary calculations, in response to signals from the vehicle speed sensor 18, the ambient temperature sensor 20, the integrated cabin temperature and humidity sensor module 34, and the wiper status sensor 40 and one or more predefined programs defining operational characteristics of the HVAC system 30, tuned to the inherent physical characteristics of the vehicle 12. During the automatic HVAC control mode, the activation of the air conditioning (A/C) or heater, vent control or activation, and fan speed modulation is automatically controlled in accordance with a computer algorithm that is stored in the controller 32.

The present invention introduces one or more further algorithms, to be described hereinafter, that will be used in conjunction with existing algorithms used during control of the HVAC system 30 in the automatic mode of operation. The one or more further algorithms of the present invention, described hereinafter, are designed to automatically predict condensation or fogging conditions, and to appropriately activate the HVAC system 30 (A/C, heater, vent control, fan speed) in response thereto. Insofar as the basic operational characteristics of HVAC systems are generally well known in the art, such basic operational characteristics and methods will only be described hereinafter as they relate to the ADS 10 and method of the present invention.

The controller 32 of the present invention is electrically connected with the vehicle speed sensor 18, the ambient temperature sensor 20, the HVAC system 30, and the integrated cabin temperature and humidity sensor module 34, as illustrated in FIG. 3. However, other means such as wireless or fiber-optic communication is also possible and contemplated.

The HVAC control and display panel 36 may be a series of individual pushbuttons or, preferably, may be provided with the touch screen 38 whereby the user controls operation of the HVAC system 30 via one or more on-screen menus. For example, in addition to the set temperature, the user may select the mode of operation (full auto/semi-auto/manual); air conditioning (A/C) operation; heating operation; fresh air/ recirculation; as well as select air flow outlets 42 (i.e. via defrost vents, dashboard vents, floor vents, or one or more combinations when in the manual or semi-auto mode of operation). When in a full-auto mode of operation, the user generally inputs the desired set temperature and the HVAC system 30 responds to sensed conditions in accordance with a predetermined computer algorithm to appropriately activate the HVAC system 30. Naturally, the touch screen 38 may provide various other functions, such as a navigation screen and entertainment center, as is well known in the art.

The ambient temperature sensor 20 may be disposed at a relatively forward position on the vehicle 12, such as within an area near the front bumper 22, if desired. Naturally, it is known in the art that various locations for the ambient temperature sensor 20 may be selected, and therefore the present invention is not limited to the currently preferred ambient temperature sensor position illustrated herein. It is noted that ambient temperature sensors are now commonly provided on vehicles, and are used, for example, to permit the user to display the ambient temperature ($T_{am}$) on the screen 38.

The integrated cabin temperature and humidity sensor module 34 is preferably disposed on the vehicle dashboard 28 adjacent the HVAC control and display panel 36, as illustrated in FIG. 2. An integrated cabin temperature and humidity sensor module such as sold by Denso Corporation is preferred for various reasons.

For example, the integrated sensor module 34 is available at a significantly reduced cost as compared to individual or separate sensors. Moreover, with a single sensor module 34 sensing both temperature ($T_r$) and humidity (RH) within the cabin 16, the in-cabin physical conditions necessary to detect and respond to possible fogging conditions, as described hereinafter, are derived from a single location, leading to repeatable and consistent results for any given vehicle model. It is also believed that locating the integrated module 34 at this relatively shielded location on the dashboard 28 prevents random environmental influences, such as solar load, from impacting the operation of the sensors. Further, the integrated sensor module 34 is disposed in a location that is relatively easy to install and electrically connect to the controller 32, without the need to introduce additional steps to the assembly process.

Nevertheless, it is considered apparent that, with regard to some aspects of the invention, use of the preferred integrated sensor module 34 is not mandatory, but rather separate sensors, disposed adjacent to one another, could be used with equal functionality, albeit more expensive to manufacture and assemble. Further, although it is preferred that the temperature and humidity sensors be disposed in the front dashboard 28, this location is not necessarily mandatory. Rather, the sensors could be moved to any number of locations within the vehicle 12. Relatively forward locations within the cabin 16 may be considered more desirable since preventing or alleviating windshield 24 fogging is one aspect of the present invention.

However, while it has been found that it is important that the cabin temperature and humidity sensing is performed at the same location (to determine dewpoint, which is rather constant within the cabin 16), so long as appropriate calibration is performed, the temperature and humidity sensor 34 can be disposed at any location within the vehicle cabin 16.

In this regard it is noted that humidity is a percentage falling within the range between 0%, which is a total absence of water in the air, and 100%, which is a totally saturated condition. Thus, humidity may sometimes be referred to as absolute humidity.

Relative humidity (RH), on the other hand, is the ratio of the amount of water in the air at a given temperature to the maximum amount of water the air could hold at that temperature, and is expressed as a percentage. Therefore, relative humidity (RH) is adjusted to compensate for the temperature-dependent ability of air to hold water. Thus, there is a strict and well known relationship between ambient temperature ($T_{am}$), relative humidity (RH), and dewpoint ($T_{dp}$). Essentially, given the relative humidity (RH) and the ambient temperature ($T_{am}$), the dewpoint ($T_{dp}$) may be easily derived.

The present invention takes advantage of this fact, and calculates the dewpoint ($T_{dp}$) based upon the sensed cabin temperature ($T_r$) and the sensed relative humidity (RH) in the cabin 16 provide by the integrated sensor module 34. Preferably, this information is stored in a lookup table in the controller 32 such that, by inputting the sensed cabin temperature ($T_r$) and relative humidity (RH), a corresponding dewpoint ($T_{dp}$) is output.

Notably, a windshield glass temperature ($T_{glass}$) determination provided by the present invention does not require any additional sensors, but rather takes advantage of sensors (ambient temperature 20, cabin temperature 34, cabin humidity 34, wiper status 40, and speed 18) that are already conventionally provided by the vehicle 12 and, as such, adds functionality to the vehicle 12 without increasing the component cost thereof.

Preferably, the correlation calculation of windshield glass temperature ($T_{glass}$) to ambient air temperature ($T_{am}$) and vehicle speed ($V_{sp}$) is stored in a lookup table in the controller 32 such that, by imputing the ambient air temperature ($T_{am}$) and the vehicle speed ($V_{sp}$), a corresponding windshield glass temperature ($T_{glass}$) is output and used for further calculations, as will be apparent from the following discussion. Unfortunately this method can lead to an inaccurate prediction of the presence of fog because the windshield glass temperature ($T_{glass}$) determination is not based at all on the presence of precipitation or of cabin soaking.

In a simplified automatic HVAC control system it would seem clear that, based upon the definition of dewpoint ($T_{dp}$), so long as the windshield glass temperature ($T_{glass}$) is greater than the dewpoint ($T_{dp}$), no condensation or fog will form and, conversely, when the glass temperature ($T_{glass}$) is equal to or below the dewpoint ($T_{dp}$), a fogging condition exists (i.e., condensation or fog will form on the glass). Therefore, it would be possible to control the HVAC system so that an appropriate mode of operation (A/C and/or defrost) is activated when the glass temperature ($T_{glass}$) is equal to or less than the dewpoint ($T_{dp}$). Such a control system may work satisfactorily in some situations, and definitely provides a better result than the HVAC system lacking fog condition calculations.

However, in the aforementioned control system, when the windshield glass temperature ($T_{glass}$), which is based on ambient temperature ($T_{am}$) and vehicle speed ($V_{sp}$), is used for determining the proper HVAC settings to prevent the windshield 24 from fogging, the presence of precipitation (e.g. rain, snow, etc.) is not taken into account when determining the HVAC settings. The precipitation can lower the actual windshield glass temperature to a value that is not equal to the calculated windshield glass temperature ($T_{glass}$) that is calculated.

Similarly, in the aforementioned control system the cabin temperature ($T_r$) is not accounted for during the windshield glass temperature ($T_{glass}$) determination that is used for operating the HVAC system 30. As the cabin temperature ($T_r$) is not compared to a predetermined temperature (A) below which cabin soaking occurs, it is not known if cabin soaking conditions exist in the vehicle 12 when the HVAC system 30 is operated. As previously discussed, cabin soaking occurs when the cabin temperature ($T_r$) is less than the predetermined temperature (A) at which point the risk of fogging is high. Cabin soaking typically happens when the user initially enters the vehicle 12. During this time, if the cabin temperature ($T_r$) is low, there is an increased risk of windshield 24 fogging due to exposure from, for example, the user's breathe, or from latent moisture in the cabin (i.e., as a result of the cabin air cooling overnight). The predetermined temperature (A) has been experimentally determined to be between about 15° C. to 20° C., and more particularity about 18° C.

Since precipitation and cabin soaking can influence the presence of fog on the windshield 24, it is important that these factors be considered when operating the HVAC system 30 to prevent the formation of fog. The present invention teaches that whenever the wipers 26 are operational (e.g. there is precipitation) or the cabin 16 is experiencing soaking conditions (e.g. $T_r$<A), the windshield glass temperature ($T_{glass}$) is determined by adopting the ambient temperature ($T_{am}$) as the windshield glass temperature ($T_{glass}$). Therefore, the present invention solves the problems encountered when the windshield glass temperature ($T_{glass}$) is estimated during precipitation or cabin soaking. The present invention ensures that the ADS 10 and the HVAC system 30 effectively predict and react to fogging of the windshield 24.

As previously disclosed, the wiper status sensor 40 determines when the windshield wipers 26 are operating. The windshield wipers 26 are used any time there is an accumulation of precipitation on the windshield 24. The wiper status sensor 40 communicates the operational status of the windshield wipers 26 to the controller 32. Accordingly, the present invention teaches that the controller 32 can determine the presence of precipitation based upon windshield wiper 26 usage.

The controller 32 also determines whenever the cabin 16 is soaking. This is accomplished by monitoring the cabin temperature ($T_r$), as sensed by the integrated sensor module 34. As previously disclosed, whenever the cabin temperature ($T_r$) is less than the predetermined temperature ($T_r$<A), the cabin 16 is judged to be experiencing soaking conditions.

A fog margin (FM) is determined based upon the equation:

$$\text{Fog Margin}(FM) = \text{Windshield Glass Temperature}(T_{glass}) - \text{Dewpoint}(T_{dp}).$$

The windshield glass temperature ($T_{glass}$) is either a function of ambient temperature ($T_{am}$) and vehicle speed ($V_{sp}$) or is equal to ambient temperature ($T_{am}$), as described hereinbefore. The dewpoint ($T_{dp}$) is a function of in-cabin temperature ($T_r$) and relative humidity (RH), as also described hereinbefore.

Based upon the fog margin (FM), the controller 32 will communicate with the HVAC system 30 the appropriate action to be initiated. For example, when a low fog margin (FM) is calculated, the HVAC system 30 may be instructed to increase fan speed and/or increase the temperature of air being discharged out of the outlets 42 near the windshield 24. Alternatively, if the fog margin (FM) is high, the HVAC system 30 may be instructed by the controller 32 to reduce fan speed. The air conditioning (A/C) or heater lowers or raises the air discharge temperature.

Figure 4:
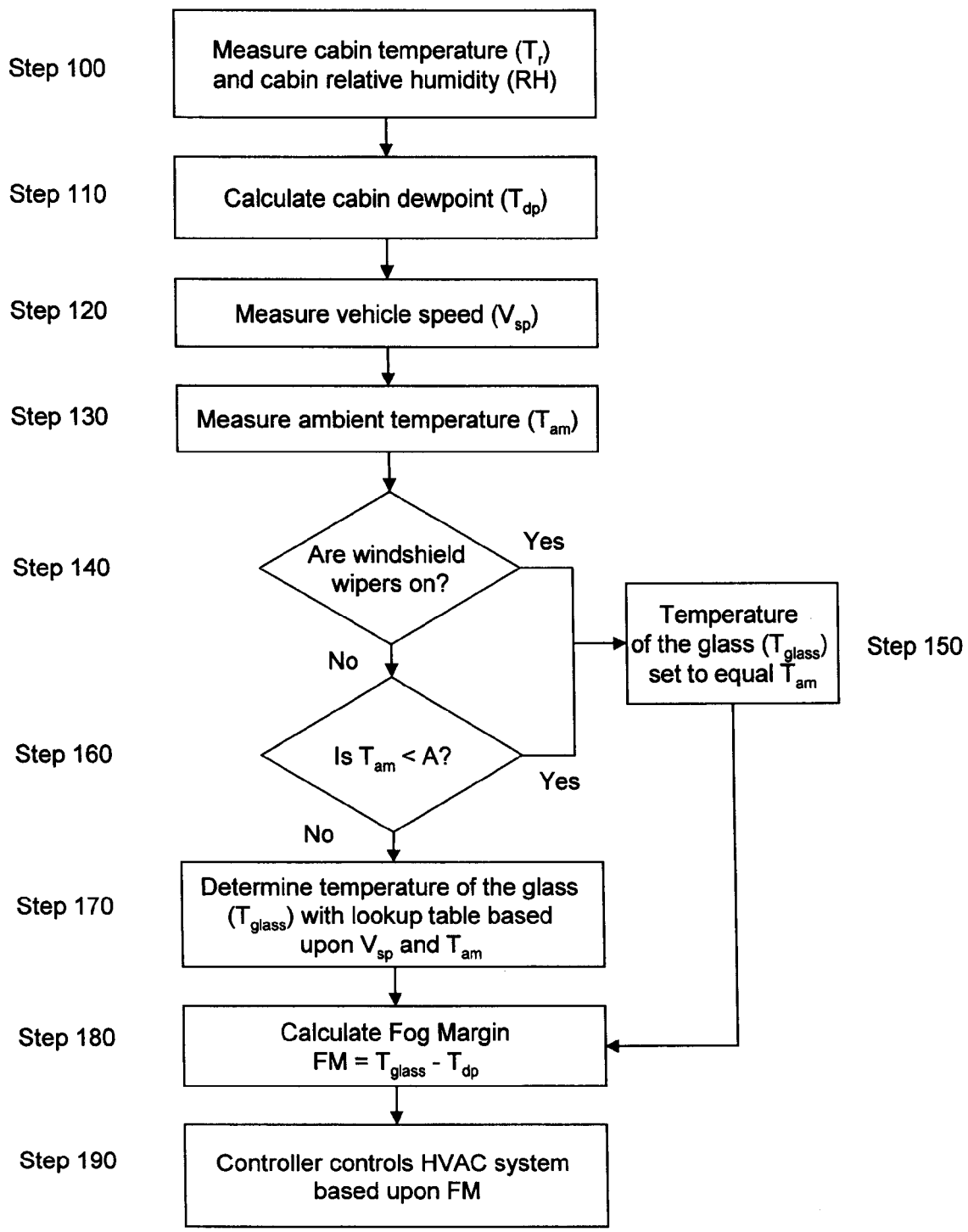
FIG. 4 is a flowchart illustrating a method according to the present invention.

A method of using the present invention is illustrated in FIG. 4. In Step 100, the cabin temperature ($T_r$) and cabin relative humidity (RH) are measured. Then, the cabin dewpoint ($T_{dp}$) is determined (Step 110). The vehicle speed ($V_{sp}$) and the ambient temperature ($T_{am}$) are also measured (Steps 120, 130). In Step 140, the controller 32 determines if the windshield wipers 26 are operating. If the windshield wipers 26 are operating, the temperature of the glass ($T_{glass}$) is set to be equal to the ambient temperature ($T_{am}$) (Step 150) and the process is advanced to Step 180. Alternatively, if the windshield wipers 26 are not operating, the controller 32 determines if the cabin 16 is soaking (Step 160). If the cabin 16 is soaking ($T_r$<A), the temperature of the glass ($T_{glass}$) is set to equal the ambient temperature ($T_{am}$) (Step 150) and the process is advanced to Step 180. On the other hand, if the windshield wipers are off and the cabin 16 is not soaking, the glass temperature ($T_{glass}$) is determined with a lookup table based upon the vehicle speed ($V_{sp}$) and the ambient temperature ($T_{am}$) (Step 170). In Step 180, the fog margin (FM) is calculated. Finally, the controller 32 controls the HVAC system 30 based upon the fog margin (FM) (Step 190).

By taking into account the presence of precipitation and cabin temperature, the present invention more accurately senses when conditions are favorable for fogging of the windshield 24 and then takes the appropriate actions to prevent the fogging.

As described hereinabove, the present invention solves many problems associated with previous type devices. However, it will be appreciated that various changes in the details, materials and arrangements of parts, which have been herein described and illustrated in order to explain the nature of the invention, may be made by those skilled in the art without departing from the principle and scope of the invention, as expressed in the appended claims.

What is claimed is:

1. A method for controlling a vehicle HVAC system to reduce a likelihood of fog forming on a window glass of the vehicle, comprising the steps of:
   calculating a dewpoint of air within a cabin of said vehicle;
   sensing operation of windshield wipers;
   measuring ambient air temperature;
   measuring a moving speed of the vehicle;
      wherein, when the windshield wipers are not operating, calculating a window glass temperature based upon vehicle speed and ambient air temperature;
      wherein, whenever the windshield wipers are operating, always using the ambient air temperature as the window glass temperature;
   determining a fog margin based upon the window glass temperature and said calculated dewpoint, by subtracting the calculated dewpoint from the windshield glass temperature, said fog margin being a measure of the likelihood of fog forming on said vehicle window; and
   operating said HVAC system in accordance with a predetermined algorithm based upon said fog margin.

2. The method for controlling the vehicle HVAC system to reduce the likelihood of fog forming on the window glass of the vehicle according to claim 1, wherein said dewpoint calculating step includes the steps of:
   measuring relative humidity of air within the cabin of said vehicle;
   measuring an interior air temperature of the cabin of said vehicle and,
   determining said dewpoint based upon a predetermined relationship between said measured interior air temperature and the relative humidity.

3. A method for controlling a vehicle HVAC system to reduce a likelihood of fog forming on a window glass of the vehicle, comprising the steps of;
   measuring interior air temperature within a cabin of said vehicle;
   calculating a dewpoint of air within the cabin of said vehicle;
   measuring ambient air temperature;
   measuring a moving speed of the vehicle;
      wherein, whenever the windshield wipers are operating, always using the ambient air temperature as the window glass temperature;
      wherein, when the windshield wipers are not operating and when said interior air temperature is greater than a predetermined value, calculating a window glass temperature based upon vehicle speed and ambient temperature;
      wherein, when the windshield wipers are not operating and when the interior air temperature is less than a predetermined temperature, using the ambient air temperature as the window glass temperature;
   determining a fog margin based upon the window glass temperature and said calculated dewpoint, by subtracting the calculated dewpoint from the windshield glass temperature, said fog margin being a measure of the likelihood of fog forming on said vehicle window; and
   operating said HVAC system in accordance with a predetermined algorithm based upon said fog margin.

4. The method for controlling the vehicle HVAC system to reduce the likelihood of fog forming on the window glass of the vehicle according to claim 3, wherein said dewpoint calculating step includes the steps of:
   measuring relative humidity of air within the cabin of said vehicle; and,
   determining said dewpoint based upon a predetermined relationship between said measured interior air temperature and the relative humidity.

5. The method for controlling the vehicle HVAC system to reduce the likelihood of fog forming on the window glass of the vehicle according to claim 3, wherein said predetermined temperature is between about 15° C. to 20° C.

6. The method for controlling the vehicle HVAC system to reduce the likelihood of fog forming on the window glass of the vehicle according to claim 5, wherein said predetermined temperature is about 18° C.

* * * * *